July 13, 1926.

C. F. MILLER ET AL 1,592,038

REGISTERING DEVICE

Original Filed Jan. 29, 1918   3 Sheets-Sheet 1

Inventors
Chas. F. Miller and
John Millis
by Chas. F. Williamson
atty.

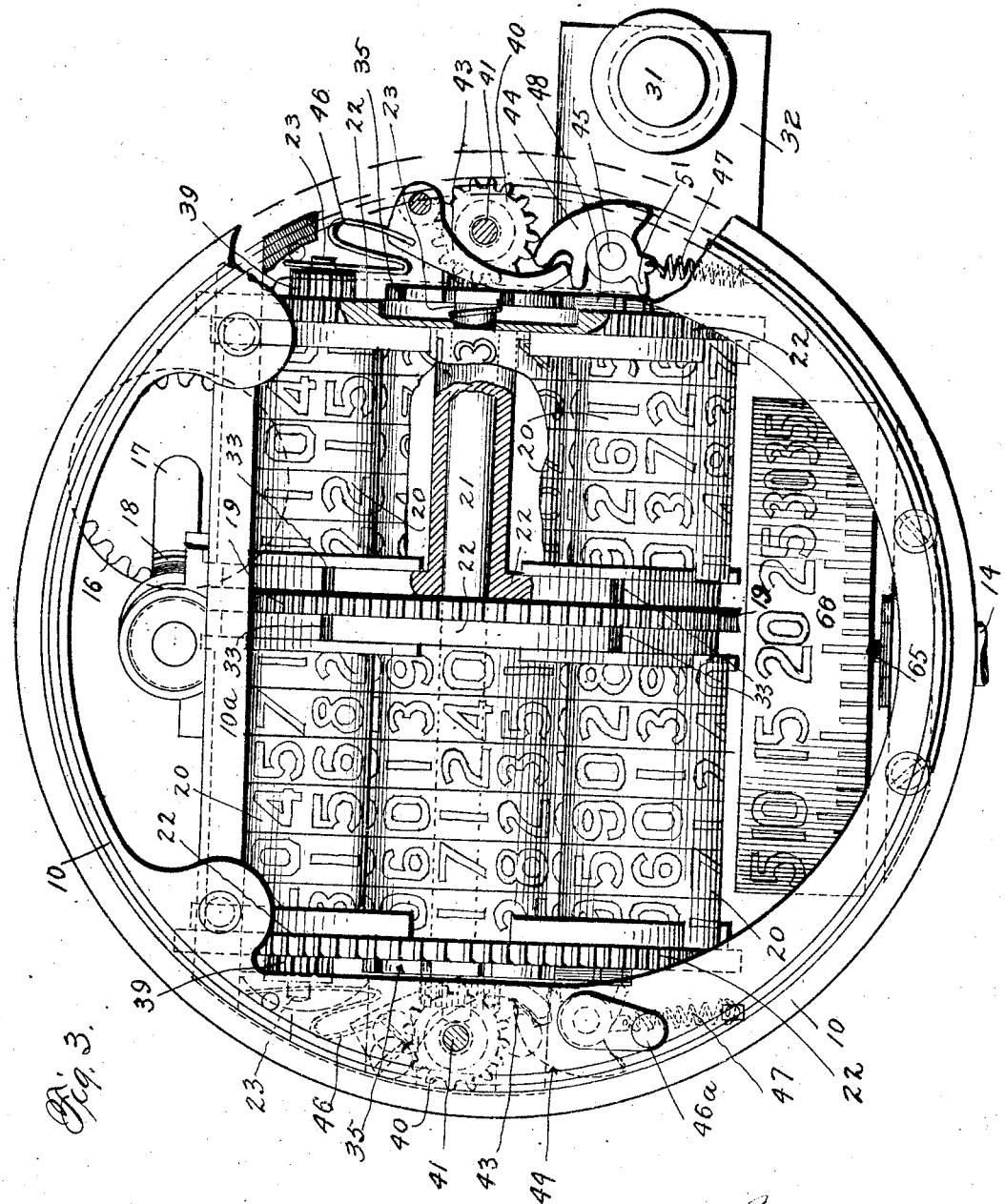

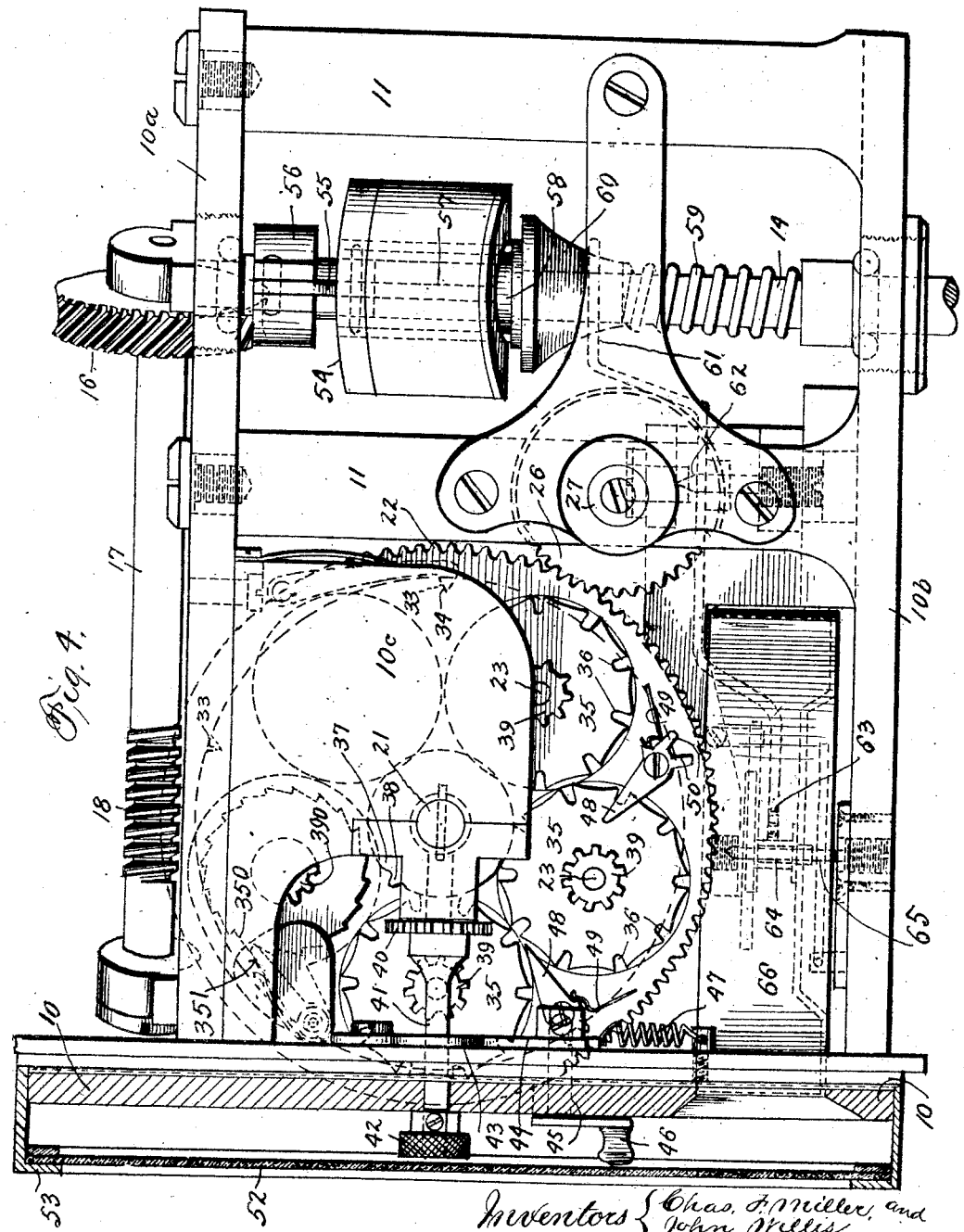

Patented July 13, 1926.

1,592,038

UNITED STATES PATENT OFFICE.

CHARLES F. MILLER AND JOHN WILLIS, OF LANCASTER, PENNSYLVANIA, ASSIGNORS, BY MESNE ASSIGNMENTS, TO MARVIN SMITHEY, OF LAWRENCEVILLE, VIRGINIA.

REGISTERING DEVICE.

Application filed January 29, 1918, Serial No. 214,367. Renewed September 17, 1924.

Our invention relates to metering and registering apparatus for use with automobiles, employing a large number of odometers or counters which register mileage for making and preserving an accurate account of the mileage of each of the tires as well as the total and trip mileage, and for keeping track on a mileage basis of other matters connected with the operation of the car. It is essential to commercial success that such an instrument be absolutely accurate in its operations, be of a minimum number of parts to enable economical manufacture, which is affected by the number of parts, because of their cost and also by the time and labor required for their assemblage, be as compact or reduced within as simple a compass as possible, because of the limited space available on the car for such a mechanism, and be capable of easy and simple manipulation in making use of it. In making the invention, we have had all these considerations in mind, and it will be found that the mechanism in which is embodied the invention fulfills all the conditions just set forth.

In the accompanying drawings:—

Fig. 3 is a face view, the dial removed and a portion of the casing being shown broken away;

Fig. 4 is an end view, the casing being omitted, and parts being shown in section.

Figure 2:
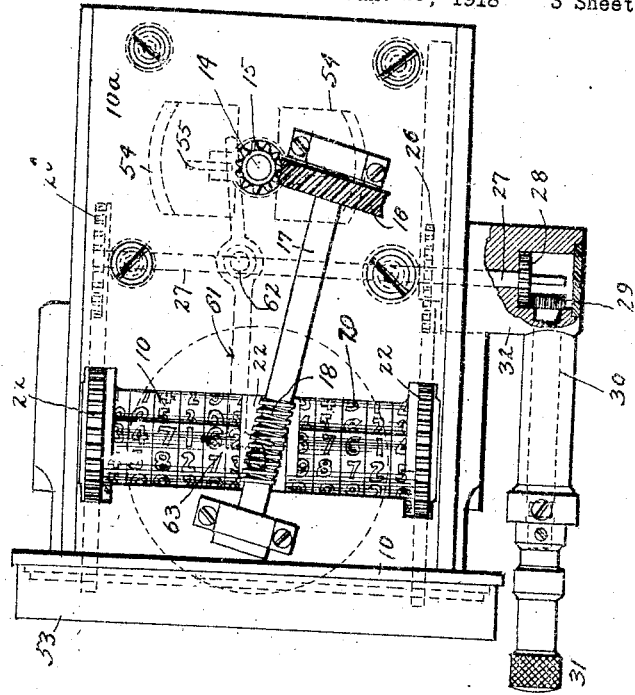
Fig. 2 is a top plan view.
Figure 1:
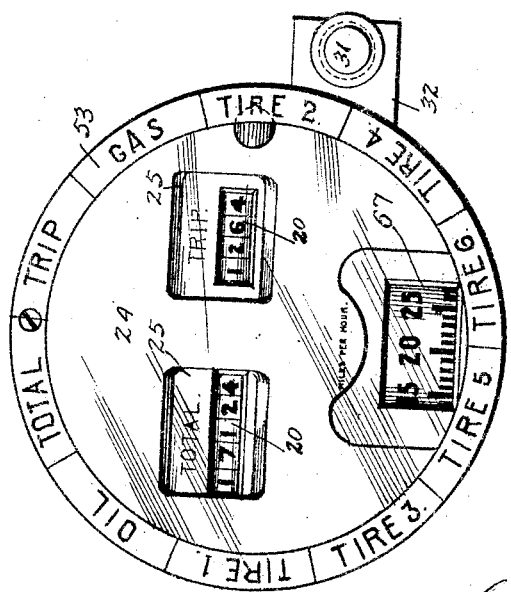
Fig. 1 is a face or front view of a metering and registering mechanism embodying our invention.

Briefly described, the instrument shown in the drawings as embodying our invention comprises a large number of odometers or registers and a common operating shaft which is connected with and receives motion from one of the carrying wheels of the car, and the collection of odometers being movably mounted, so that in succession they may be brought into position for reading their registrations. Proceeding now with a description in detail of the construction and arrangement of parts appearing in the annexed drawings, it will be found that the supporting frame work is substantially cylindrical and consists of the front circular plate 10, top plate 10$^a$, and bottom plate 10$^b$, which are spaced apart at the back by several posts 11. The top and bottom plates have bearings (preferably ball) for the vertically arranged driving shaft 14 whose lower end is connected to the usual flexible shaft (not shown) by which driving connection is made with one of the wheels of the car. Said driving shaft 14 is thus located at the back of the instrument. On the upper end of the shaft 14 is a spiral gear 15 which meshes with a spiral gear 16 upon a horizontal shaft 17 that is journaled at its opposite ends in bearings upon the top plate 10$^a$. Near its forward end the horizontal shaft 17 has a worm 18 which meshes with a worm wheel 19 of large diameter on a shaft 21 mounted at its opposite ends in bearings in depending arms 10$^c$ on the top plate 10$^a$.

The odometers or registers 20 are arranged in two circular series or groups on each side of the worm wheel, each series being carried by the flanges of a spool that consists of a sleeve mounted on the shaft 21 and a pair of disks 22 that constitute the spool flanges and which are spaced apart a distance equal to the length of the odometers, and each odometer being mounted on a spindle 23 which is supported in alining holes in the flanges or disks 22. The drawings illustrate each group of odometers as consisting of four but the number may be varied and we, therefore, do not limit ourselves to any particular number. The arrangement of the odometers in two groups or series, enables a large number of odometers to be employed without sacrificing compactness of the instrument. In the face plate, or dial 24 there is a single sight opening 25 for each group of odometers. The outer flange or disk 22 of each spool has gear teeth in its periphery so that each is a gear wheel, and meshing with each gear wheel is a pinion 26 upon a horizontal shaft 27 at the rear of the odometers which at one end has a pinion 28 with which meshes a pinion 29 on the inner end of a horizontal shaft 30 that extends forwardly to the face of the instrument and at its front end has a knurled head 31 by which it may be conveniently revolved by the fingers and thus the two groups of odometers simultaneously revolved to bring any desired alining pair of odometers of the two groups opposite the display openings 25 in the face of the dial. Said shaft 30 and the intermeshing gears 28 and 29 are supported and housed by a hollow bracket arm 32 attached to the side of the frame. In the periphery of each of the inner flanges of the two spools are equidistant indexing notches 33 which are adapted to be engaged in succession by spring pawls 34 which serve to yieldingly hold the odometer groups against accidental turning.

Upon the outer end of each odometer spindle 23 is a wheel 35 having in its periphery a series of notches 36 with its periphery between adjacent notches concavely curved to conform to and fit the curvature of the periphery of a wheel or disk 37, keyed to the shaft 21 and having preferably a single tooth 38 which by the revolution of the wheel 37 is brought into engagement with the notches 36 of the wheels 35 as the wheel 37 revolves, the wheels 35 and 37 being the well-known Geneva stop gearing. Thus, the driving shaft is called upon to actuate but one odometer mechanism of each group at a time, and hence, the work may be easily done and without serious strain upon the parts involved, and the accidental turning of the odometers in the intervals between their movement by the tooth 38 is efficiently and yet simply guarded against.

Upon each odometer spindle 23 adjacent the wheel 35 thereon is a pinion 39 for cooperation with a toothed wheel 40 on a shaft 41 mounted in bearings in the front frame plate and in the arm 10ᶜ and which has on its outer end a turning head 42 for revolving the wheel 40 and constituting a zero resetting device. The pinion 39 of each odometer may be brought in succession into engagement with the wheel 40, and the wheels 35 and 37 being disconnected, the odometer may be reset to zero. The disengagement of the odometer for zero resetting and the meshing of the wheel 40 with a pinion 39 are both produced by the endwise movement of the shaft 41 by pulling on the knob 42. The shaft 41 has a tapering portion which bears against the end of the pinion shaft and moves the same endwise against the pressure of a spring which on the reverse endwise movement of the shaft 41 restores the pinion and associated parts for again driving the odometer.

It is desirable to be able to render any one odometer inactive. This is accomplished by shifting its wheel 35 axially to place it out of position to be driven by the tooth 38 of the driving wheel 37. We provide means for shifting said wheel axially when the odometer is at the display opening and for this purpose pivot on the inner side of the front frame plate 10, a finger 43 which is adapted to be rocked against the side of said odometer wheel to shift it axially by means of a lever 44 pinned to a rock shaft 45 pivoted in the front plate 10 and having on the dial side a crank 46ᵃ for rocking it. A spring 46 acting on the wheel engaging arm holds the latter yieldingly out of contact with said wheel, and a second spring 47 acting on said rock shaft lever moves the latter to and holds it yieldingly in active position. The odometer wheel 35 when moved into inactive position is there held by a finger 48 which is pivoted to the outside of the outer spool flange 22 so that it may be rocked into a position to overlie said wheel or into a position to one side thereof and it is held yieldingly in either of its two positions by a spring 49 and it is movable into its two positions by two teeth 50 on the finger 48 which alternately engage a projection 51 on said lever 44 such engagement being timed for the proper movements of the locking finger and the wheel shifting arm.

The dial is covered by a circular plate or disk 52 of glass mounted in a bezel or ring 53 which fits over the edge of the circular front plate 10 and preferably secured in position by a key controlled lock so that as the resetting knobs, and the cranks that render the odometer inoperative, are housed by said glass and ring there can be no unauthorized access thereto. On the face of said ring are printed or engraved designations corresponding with those for the respective odometers, or registering devices, as for example, "Total"; "Trip"; "Oil"; "Gas"; "Tire 1"; "Tire 2"; "Tire 3"; "Tire 4"; "Tire 5"; and "Tire 6". The words "Total" and "Trip" are preferably at the top and they form the starting point counting from which any desired odometer or register may be brought to the sight or display opening. Thus for example, the odometer for "Tire 1" and for "Tire 2" (which align) are known to be the second after the total and trip odometers because they are the second designations after the designation "Total" and "Trip" on the indexing ring. We are thus able to employ a stationary index and yet with ease and facility may bring any desired odometer or register into reading position. For the designations "Gas" and "Oil," a register or counter is provided in each case, but they, of course, are not automatically operated but each is set by hand according to the quantity of gas or oil supply, the zero setting device being used for that purpose. Each of said registers is arranged with one of the groups or series of odometers and by the revolution of the spools which carry the odometers said registers are brought into position at the display openings and into position for operation by the zero setting device. As shown in Fig. 4, each register has a setting pinion 390, and a ratchet wheel 350 and detent 351 to prevent back rotation.

The odometers shown need not be described in detail, for their construction is a well-known one of the type consisting of a series of numerals-bearing rings mounted side by side and with internal transfer mechanism by means of which, at each revolution of a ring of lower denomination, the adjacent ring of higher denomination will be moved through one-tenth of a revolution.

We utilize the driving shaft 14 to support the centrifugal arms of a speedometer actuating mechanism because it makes a compact, simple construction and because it has been found that with the centrifugal arms mounted on an upright axis, the speedometer is both sensitive and accurate. There are two centrifugal arms 54, each pivotally hung by a link 55 from a collar 56 mounted on the shaft 14 just below the top plate 10ª. Each of said centrifugal arms is connected by a link 57 with a vertically slidable sleeve 58 mounted on the shaft 14 and pressed upward by a coil spring 59 so that said sleeve is moved downward as the centrifugal arms swing outward in the revolution of the shaft. On the lower end of said sleeve 58 is a cone 60 with slightly concave sides that engages one end of a horizontal lever 61 having a pivot 62 in bearings supported on the bottom plate whose other end carries a gear segment 63 which meshes with a pinion 64 on a vertical shaft 65 which carries an indicator drum 66 of the speedometer, said drum being thus mounted in a horizontal position. The numerals or graduations on the periphery of said drum are exhibited through a display opening 67 in the lower part of the dial below the display openings for the odometers or registers.

By the relative arrangement of the parts we are able to get them all within a small compass and within the circumference of the circular front plate 10 which is an important consideration because by reason of the ground or substantially cylindrical form which the device is given, it can be readily placed in the round opening usually provided on the instrument board for the ordinary speedometer.

Having thus described our invention what we claim is:—

1. An instrument of the class described comprising groups of registers mounted side by side, a rotary support for each group, a common operating means for all of the registers comprising a shaft upon which said rotary supports are mounted, shaft driving mechanism situated between the two groups of registers, a single means for rotating both groups of registers, means for transmitting motion from said single means directly to the supports of both groups, a face plate over the registers having a sight opening to which the registers are brought in succession by rotation of their support, and means for actuating the registers of the groups.

2. An instrument of the class described comprising two circular groups of registers mounted side by side, a common operating means for all the registers, a shaft concentric with said groups, a shaft rotating member situated between the two groups, a rotatable support for each group mounted on the shaft, a gear wheel for each rotatable support, a pinion meshing with each gear wheel, and a single operating device for both pinions.

3. An instrument of the class described comprising two circular groups of registers mounted side by side, a shaft concentric with said groups, a rotatable support for each group mounted on the shaft, a gear wheel for each rotatable support, a pinion meshing with each gear wheel, a single operating device for both pinions, a wheel secured to the shaft between the two groups, means for revolving said wheel, and a driving connection between said shaft and registers of each group.

4. An instrument of the class described comprising a frame having a circular end plate, and top and bottom plates, a plurality of registers, a movable support for said registers mounted in rear of said circular plate and between said top and bottom plates, a dial over the registers having a sight opening to which the registers are brought in succession by the movement of their support, a vertical driving shaft in rear of the registers and supported by said top and bottom plates, and a driving connection between said driving shaft and said registers for actuating each of the latter comprising a wheel, and a shaft geared thereto and extending over the top plate.

5. An instrument of the class described comprising a frame having a circular end plate and top and bottom plates, a plurality of registers, a movable support for said registers mounted in rear of said circular plate and between said top and bottom plates, a dial over the registers having a sight opening to which the registers are brought in succession by the movement of their support, a vertical driving shaft in rear of the registers and supported by said top and bottom plates, a driving connection between said driving shaft and said registers for actuating each of the latter, a rotatable speed indicating drum mounted on a vertical axis beneath said registers, a centrifugal device mounted on said vertical driving shaft, and means for transmitting movement of said centrifugal device to said drum.

6. An instrument of the class described comprising a plurality of registers, means for automatically actuating each register comprising a driving and a driven wheel, a movable support for the registers, a face plate having a sight opening to which the registers are brought in succession by the movement of their support, a stationarily mounted device for placing the driven wheel of each register in inoperative position to which the registers are brought in succession by the movement of their support, a locking device to hold said wheel in inoperative position, and a common actuator for both said devices, said locking device being movable into and out of position overlapping the wheel.

7. An instrument of the class described comprising a plurality of registers, means for automatically actuating each register comprising a driving and a driven wheel, a movable support for the registers, a face plate having a sight opening to which the registers are brought in succession by the movement of their support, a stationarily mounted device for placing the driven wheel of each register in inoperative position to which the registers are brought in succession by the movement of their support, said means comprising a pivoted arm and a rock shaft, and a locking device to hold the wheel in inoperative position actuated by said rock shaft.

8. An instrument of the class described comprising a register, means for actuating the register comprising a driving and a driven wheel, a movable support for the register, a stationarily mounted device for placing the driven wheel of the register in inoperative position to and from which such wheel is brought by the movable register support, a locking device to secure said wheel in inoperative position, and a common actuator for both said devices.

9. An instrument of the class described comprising a register, means for actuating the register comprising a driving and a driven wheel, a movable support for the register, a stationarily mounted device for placing the driven wheel of the register in inoperative position to and from which such wheel is brought by the movable register support, a locking device to secure said wheel in inoperative position, and a common actuator for both said devices, said locking device being movable by said actuator into and out of position overlapping the wheel.

In testimony that we claim the foregoing we have hereunto set our hands.

CHARLES F. MILLER.
JOHN WILLIS.